US008843488B1

(12) United States Patent
Chong et al.

(10) Patent No.: US 8,843,488 B1
(45) Date of Patent: Sep. 23, 2014

(54) NESTED DISPLAY OF CONTEXTUAL SEARCH RESULTS

(75) Inventors: Daniel H. Chong, Mukilteo, WA (US); Michael T. Clare, Enumclaw, WA (US); Roger A. Jerrell, Renton, WA (US); Johnnie Michael Wright, Seattle, WA (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 13/407,184

(22) Filed: Feb. 28, 2012

(51) Int. Cl.
*G06F 17/30* (2006.01)

(52) U.S. Cl.
CPC .............................. *G06F 17/30882* (2013.01)
USPC ......................................................... 707/736

(58) Field of Classification Search
CPC .................... G06F 17/30873; G06F 17/30882
USPC .................. 707/722, 737, 726, 736
See application file for complete search history.

(56) References Cited

U.S. PATENT DOCUMENTS

| | | | | |
|---|---|---|---|---|
| 6,088,707 A * | 7/2000 | Bates et al. | | 715/235 |
| 6,167,368 A * | 12/2000 | Wacholder | | 704/9 |
| 7,809,714 B1 * | 10/2010 | Smith | | 707/713 |
| 7,836,060 B1 * | 11/2010 | Rennison | | 707/749 |
| 8,275,759 B2 * | 9/2012 | Imig et al. | | 707/706 |
| 8,463,810 B1 * | 6/2013 | Rennison | | 707/771 |
| 8,484,177 B2 * | 7/2013 | Lee | | 707/706 |
| 2002/0073079 A1 * | 6/2002 | Terheggen | | 707/3 |
| 2002/0184188 A1 * | 12/2002 | Mandyam et al. | | 707/1 |
| 2004/0205061 A1 * | 10/2004 | Nakazato et al. | | 707/3 |
| 2007/0106659 A1 * | 5/2007 | Lu et al. | | 707/5 |
| 2007/0112764 A1 * | 5/2007 | Yih et al. | | 707/5 |
| 2008/0263022 A1 * | 10/2008 | Kostorizos et al. | | 707/5 |
| 2009/0204602 A1 * | 8/2009 | Sarlos | | 707/5 |
| 2010/0223257 A1 * | 9/2010 | Milic-Frayling et al. | | 707/722 |

* cited by examiner

*Primary Examiner* — Jorge A Casanova
(74) *Attorney, Agent, or Firm* — Steven R. Corey

(57) ABSTRACT

In one aspect, methods for presenting an enhanced search result including, for at least one search result document link, the steps of 1) compiling a list of secondary document references appearing in the linked document, 2) identifying links to the secondary documents referenced in the list of secondary document references, and 3) constructing a list of search result document secondary links. The methods subsequently display the list of search result document secondary links as a nested display under an associated search result document link. In another aspect, methods for populating a search database where, for each document in a document collection, the methods a) compile a list of secondary document references appearing in the document, b) identify a link to each secondary document referenced in the list of secondary document references, and c) store at least the identified links as metadata associated with a search database copy of the document.

20 Claims, 4 Drawing Sheets

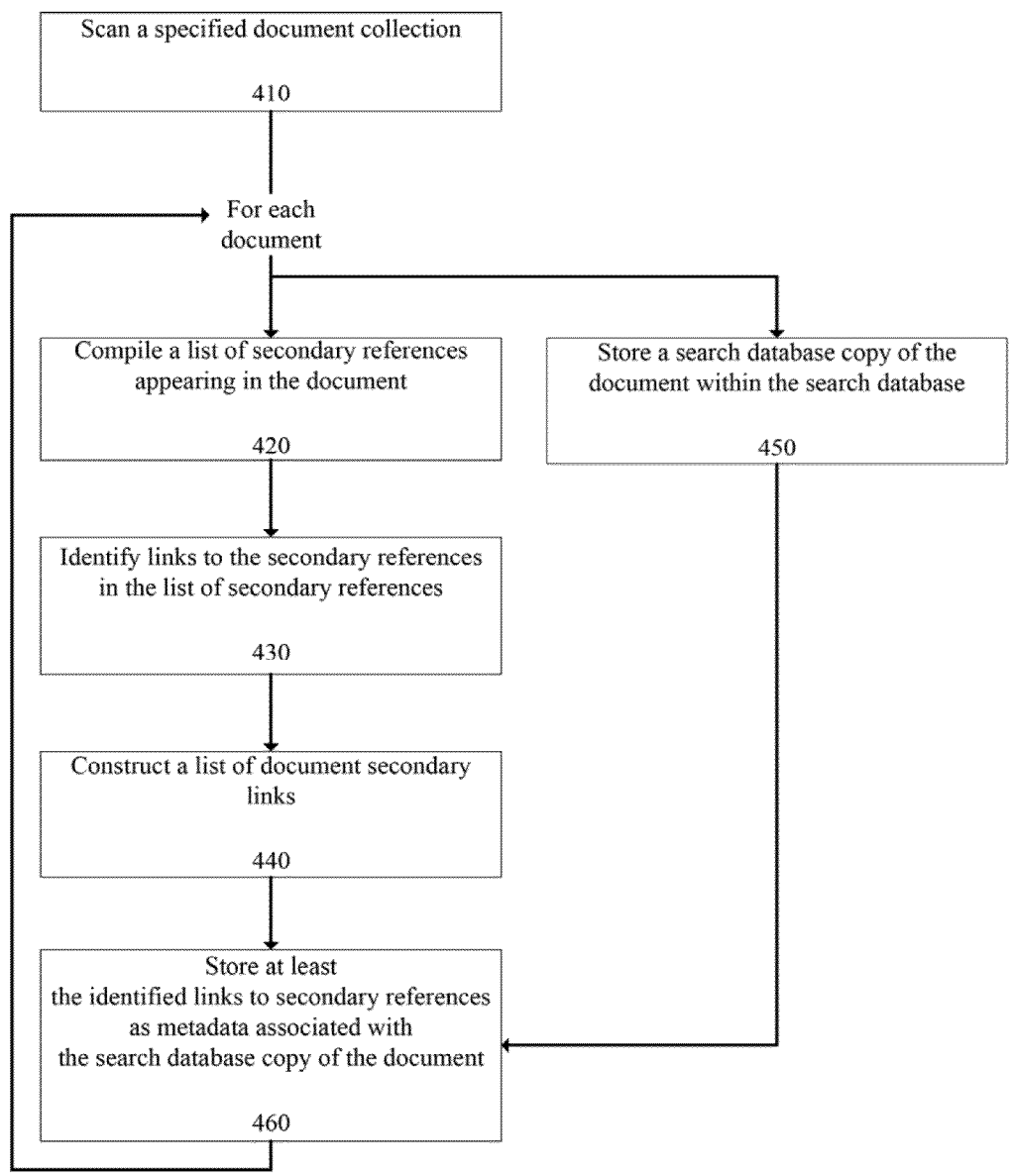

NESTED DISPLAY OF CONTEXTUAL SEARCH RESULTS

FIELD

The present disclosure is directed to methods for the display of a search result generated in response to a search query performed against a search database, and more particularly to a structured display of search result document links incorporating specified content from each linked document into a respective search result document summary.

BACKGROUND

Search engines have become essential tools used to identify and locate specific information within large document collections. Search engines are computer programs which accept search queries, such as natural language or structured queries that contain specified key words. Search algorithms are used to compare each search query against a search database in order to return a search result. The search database generally consists of a local cache of documents gathered by periodically scanning though specified document collections and/or "crawling" through structured documents which contain links (such as hyperlinks) which may identify the location of new documents in previously unknown document collections. The search result generally comprises a ranked list of document links presented in order of apparent relevance. Various search engines, such as the Google and Bing search engines, may also include document summaries consisting of one-to-three sentence segments of text from each linked document containing the key words specified in the search query. Finally, some search engines, such as the Google search engine, may include additional hyperlinks in a document summary. Such hyperlinks may link to a cached copy of the linked document, or perform an additional search query using the specified key words to return a second search result having a ranked list of document links presented in order of apparent relevance and similarity to the content of the site hosting the selected document summary (i.e., Google's "related:" search operator and "Similar" hyperlink).

SUMMARY

The applicant has developed a method for presenting a structured display of search result document links. The method incorporates specified content from each linked document into a respective search result document summary in order to assist the user in identifying and navigating to other documents referenced in the linked document. In particular, the method assists the searcher in identifying and navigating to contextually relevant "secondary documents" which are referenced within a linked document, or so-called "primary document," by presenting links to such secondary documents within the initial search result. As such, users do not have to copy and paste inactive text into an address bar, convert inactive text into a document link, or enter additional search queries in order to locate links to a secondary document. In conventional lists of document links, a secondary document will only appear in the list in proximity to a primary document if it has a similar apparent relevance and rank based upon the initial search query—but frequently they will be well separated from the primary document amongst thousands of returned results. Often users must review the primary document and subsequently construct a specific search query directed to each referenced secondary document in order to gather those documents which a presumptively reasonable authority (the author(s) of the primary document) have already identified as being particularly relevant to the topic at hand. In contrast, a user of the disclosed method may more reliably and efficiently identify, select, and retrieve a collection of primary and secondary documents using only an initial search query and the disclosed structured display.

In a first aspect, the disclosure relates to methods for presenting a search result comprising the steps of, 1) receiving a search query, 2) applying a search algorithm to compare the search query against a document collection in order to generate a search result, and 3) displaying the search result as a list of search result document links. The method also includes, for at least one search result document link, the steps of, a) compiling a list of secondary document references appearing in the linked document, b) identifying links to the secondary documents referenced in the list of secondary document references, and c) constructing a list of search result document secondary links including the identified links. The methods yet also include the step of further displaying the list of search result document secondary links as a nested display under the associated search result document link.

In a second aspect, the disclosure relates methods for populating a search database comprising the steps of, 1) scanning though a specified document collection and 2) for each document in the specified document collection, a) compiling a list of secondary document references appearing in the document, b) identifying links to the secondary documents referenced in the list of secondary document references, and c) storing at least the identified links to secondary documents as metadata associated with a search database copy of the document within the search database. The second aspect may be combined with the first to reduce the real-time processing burden of the method in various embodiments.

BRIEF DESCRIPTION OF THE DRAWINGS

FIG. 4 is a block diagram of another aspect of the disclosed method.

DETAILED DESCRIPTION

Figure 1:
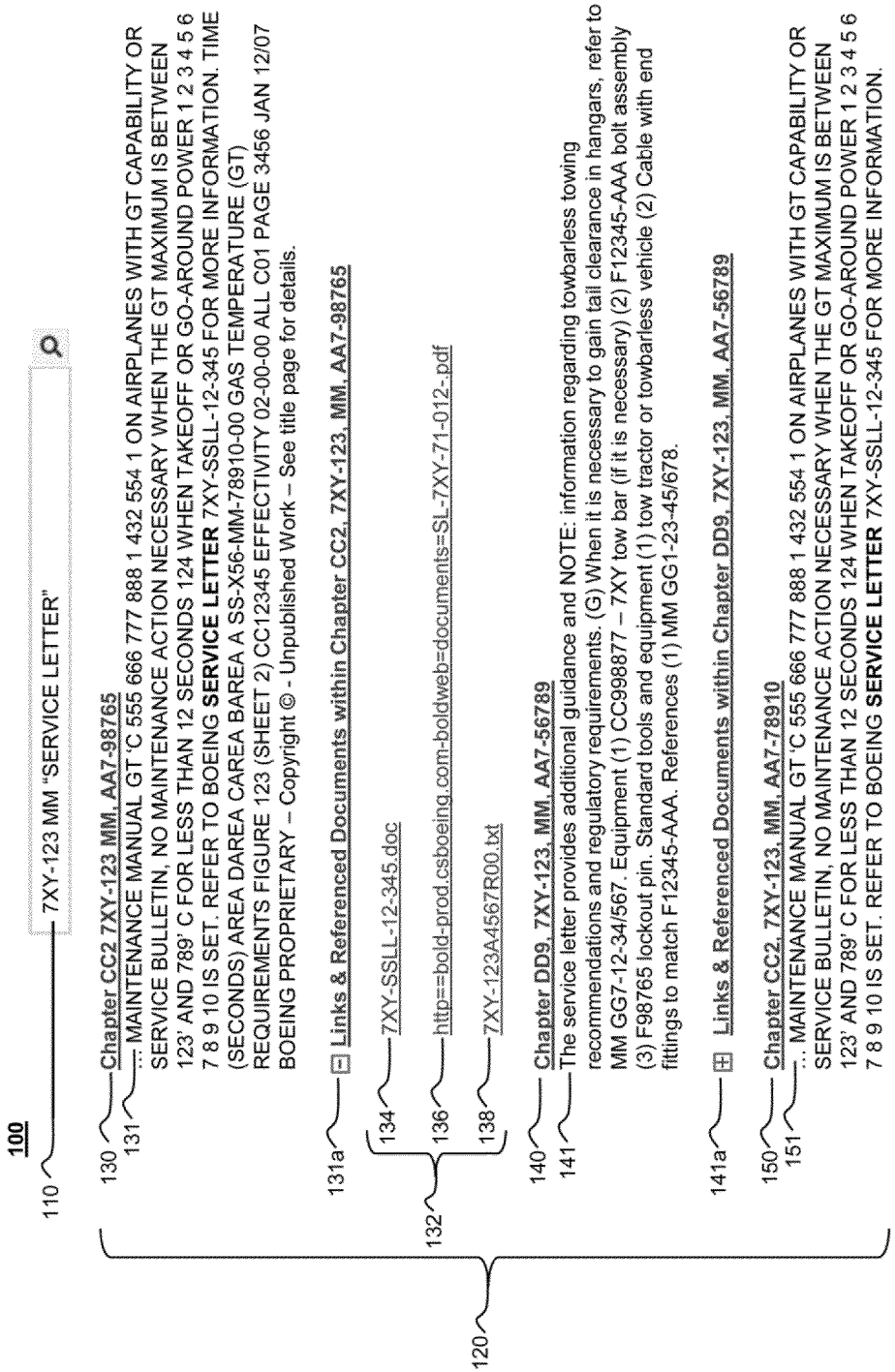
FIG. 1 is an illustration of a structured display of search result document links according to one aspect of the invention.

With initial reference to FIG. 1, a first aspect of the disclosure relates to a method for presenting a search result (100) in response to a search query. As otherwise shown in FIG. 2 (the present reference numbers referring the elements shown in FIG. 1), the method comprises the conventional steps of receiving a search query (110), applying a search algorithm to compare the search query against a document collection in order to generate a search result, and displaying the search result as a list (120) of search result document links (130, 140, and 150). Each search result document link may include a search result document summary (131, 141, 151), which may be a conventional multi-line segment of text from the linked documents containing key words specified in the search query. However, at least one search result document summary incorporates a list, e.g. (132), of search result document secondary links, e.g. a link to a referenced application document (134), a link to a hyperlinked application document (136), and a link to a documentary text file (138), presented as a nested display under the associated search result document link (130). The nested display may be constructed as an otherwise static portion of a search result document summary (131, 141, or 151) immediately under the search result document link (130, 140, or 150). The nested display may alternately be constructed as a dynamic portion of the search result document summary (131, 141, or 151), expandable and collapsible by clicking on a icon and/or text element, e.g. (131a), to display an expanded or collapsed nested display of search result document secondary links.

The search result (100) may be conventionally divided into "pages" of results, with each page including a list (120) of search result document links such as those shown. Thus, the method steps for generating a list (132) of search result document secondary links, e.g. (134, 136, and 138) may be performed upon page generation of a list (120) of search result document links for a preselected subset of the search result (100). In one embodiment the nested display is shown and the method performed for every list member of the preselected subset of the page. Where the nested display is constructed as a dynamic portion of the search result document summary, it may be constructed using technologies such as Dynamic Hypertext Markup Language (DHTML) or Cascading Styl Sheets (CSS) in combination with a scripting language such as JavaScript. In another embodiment, the nested display is shown and the method performed for only a user-selected search result document summary, e.g. (131). The user may select an icon and/or text element, e.g. (131a), in the search result document summary, whereupon the method steps for generating a list of search result document secondary links is performed and the list, if any secondary references are found, displayed in an expanded view of search result document secondary links. This other embodiment may be constructed using technologies such as AJAX (Asynchronous JavaScript and XML) in combination with HTML, DHTML, CSS or other display technologies. Those of skill in the art will recognize that various display generation and data exchange technologies can be used to implement the displays described herein.

Figure 2:
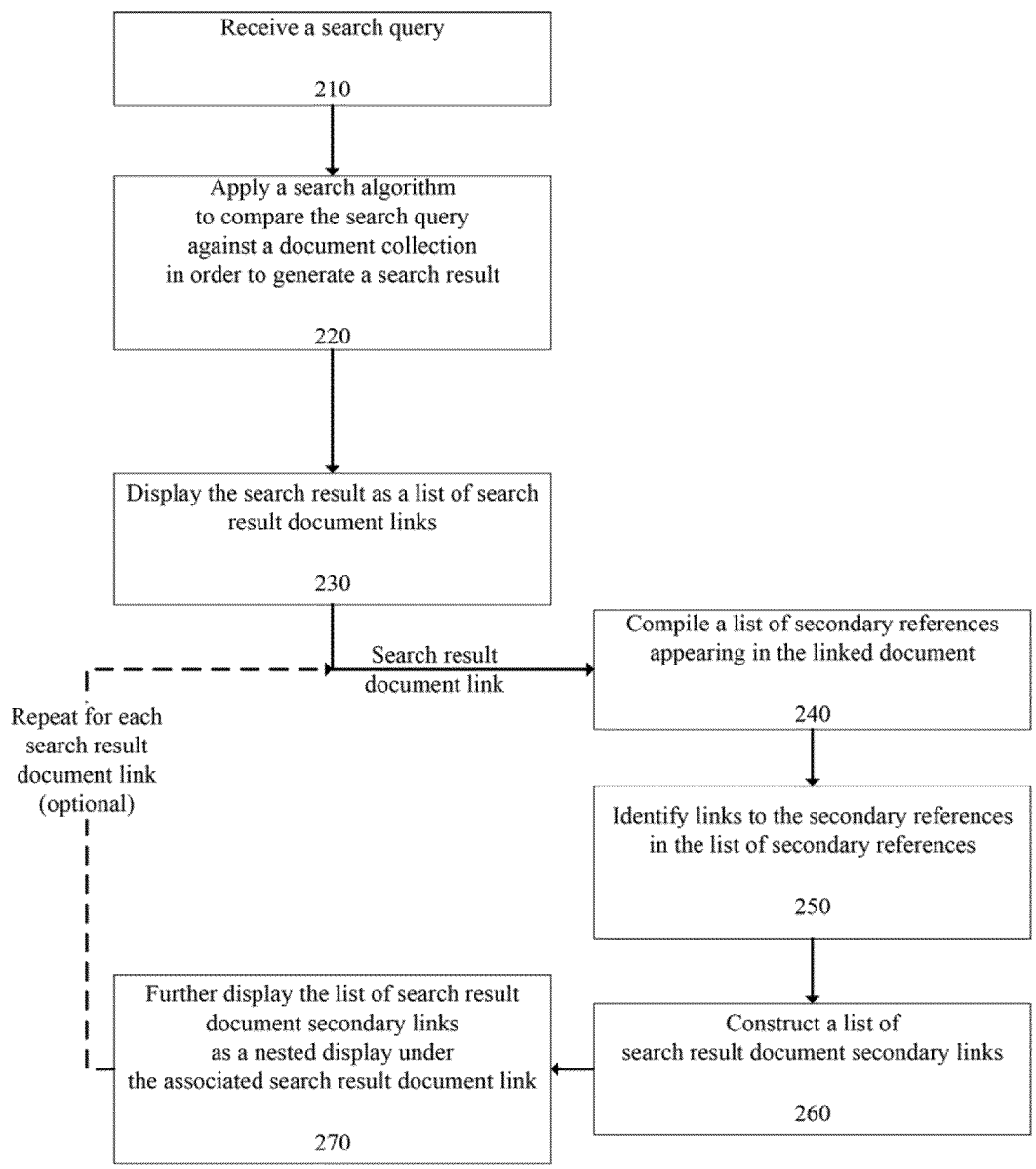
FIG. 2 is a block diagram of an aspect of the disclosed method.

Referring more specifically to FIG. 2, the method (200) generally comprises the initial steps of, 1) receiving a search query (210), 2) applying a search algorithm to compare the search query against a document collection in order to generate a search result (220), and 3) displaying the search result as a list of search result document links (230). Depending upon the particular embodiment, the method also includes, for at least one search result document link, the steps of, a) compiling a list of secondary document references appearing in the linked document (240), b) identifying a link to each secondary document referenced in the list of secondary document references (250), and c) constructing a list of search result document secondary links (260). As described above, in some embodiments steps 240-260 may be performed for a list (120) of search result document links for a preselected subset of the search result (100), such as a displayed page of search results. In other embodiments, steps 240-260 may be performed for only a selected search result document link (130) in a list (120). In yet other embodiments, discussed further below, steps 240-260 may be performed prior to receiving a search query (100), with the compiling, identifying, and constructing steps occurring during or soon after the scanning/crawling of a collection of documents. In such instances, the constructed list of identified links to secondary documents could be stored as metadata associated with a search database copy of the document within the search database.

The compiling step (240) may vary depending upon the nature of the document collection. If the document collection consists essentially of structured documents containing links to referenced secondary documents, such as an HTML document containing an "a href" tagged hyperlink to a URL (Uniform Resource Locator) or an application document containing an application-specific link to other application documents, the compiling step (240) may follow the convention of the document standard used in the document collection and/or primary document when adding secondary document references to the list, with the identifying step (250) identifying the link information in the secondary document reference link portion as the link to the secondary document. If the document collection has not been constructed or reworked so as to convert references to other documents to explicit and actionable links, then the compiling step (240) may apply a heuristic search algorithm, such as a regular expression or "regex" rule, to identify references to secondary documents according to their known characteristics—such as the format of a URL or the document naming convention documents within a collection of technical documents. The identifying step (250) may subsequently use various strategies to identify the storage location of the referenced secondary document (assuming that it is available). In some implementations, the identifying step (250) may use another heuristic search algorithm, such as a different regular expression or "regex" rule, to identify a document within the document collection referenced by the referencing information within primary document. For example, a heuristic search algorithm may identify a document which is named with, headed with, or titled with at least some of the referencing information as the referenced secondary document. In addition or alternately, the identifying step (250) may make use of an external index, database, or other information source to obtain links to one or more secondary documents—particularly those not found within a document collection itself. For example, the identifying step may identify a Digital Object Identifier (DOI) and use the DOI Registry established by the International DOI Foundation in order identify a persistent link to a published document.

The method (200) yet also includes the step d) of further displaying the list of search result document secondary links as a nested display under the associated search result document link (270). In one variation of the method, which may be suitable for use with highly structured document collections such as collections of engineering materials, technical documents, or academic articles, the further displaying step (270) may display the list of search result document secondary links in order of appearance in the linked/primary document. Those of skill in the art will appreciate that the display may be made in its entirety or divided into pages of links to secondary documents in order to limit the display space occupied by the further display within the display of the search result. In another variation of the method, which may be suitable for use with semi-structured documents or documents such as conventional web pages (which may contain large numbers of hyperlinks to advertising, other articles, other sections, or policy information), the further displaying step (270) may include the substeps of applying the search algorithm to compare the search query against the linked documents of the constructed list of search result document secondary links (272) (specifically, the linked documents themselves), ordering the constructed list of search result document secondary links according to an apparent relevance determined by the search algorithm (274), and further displaying the ordered constructed list as a nested display under the associated search result document link (276). Those of skill in the art will appreciate that, in this variation, the display is preferably divided into pages of links to secondary documents in order to limit the display space occupied by the further display, and may include additional information such as segments of text from each linked document containing the key words specified in the search query.

Figure 3:
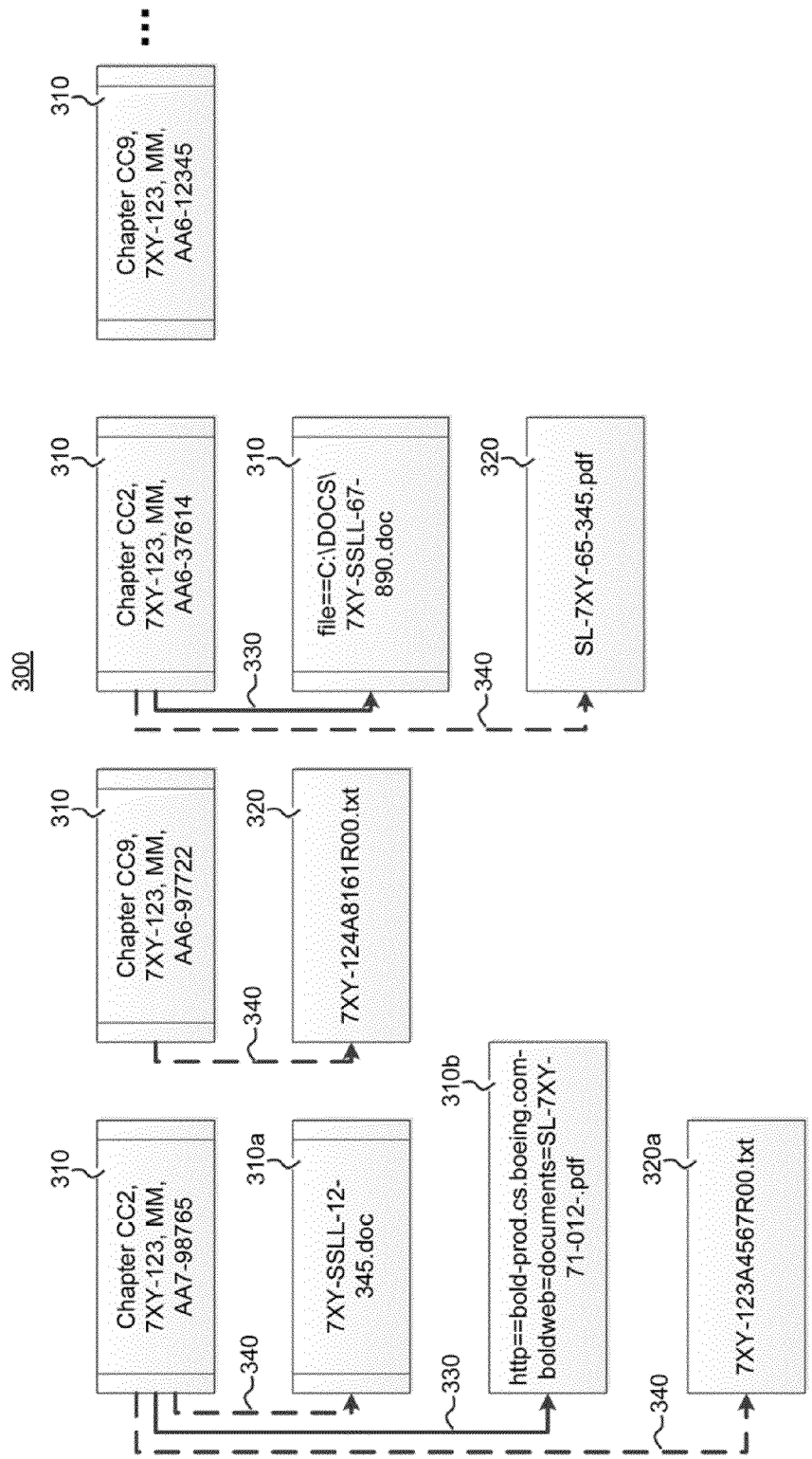
FIG. 3 is an illustration of a document collection including primary documents having both structured and unstructured references to other documents within the collection.

As shown in FIG. 3, a document collection (300) may include a mixture of structured documents (310) and unstructured documents (320) logically connected by varying links and/or references. Structured documents (310) may contain both explicit and actionable links (330) to some other documents and implicit or unactionable references (340) to yet other documents. Thus, as noted above, the compiling step (240) may, 1) only follow the convention of the document standard used in the document collection and/or primary document, and only add linked secondary documents to the list, or 2) both follow convention and apply a heuristic search algorithm to add references to secondary documents according to their known characteristics, depending upon the particular application. Where a heuristic search algorithm is used, the identifying step (250) should seek to convert the implicit or unactionable references (340) into an actionable link for the constructed list of step 260 and the further display of step 270 in order to provide the full benefit of the method. For example, as shown in FIG. 1, a semi-structured document linked to search result document link 130 may contain a simple reference to a first service letter document (310a), as well as an explicit link to a second service letter document (310b) and a documentary text file (320a). The compiling step (240) may use a heuristic search algorithm based on the format of service letter numbers to recognize a reference to the first service letter document (310a), and the identifying step (250) may use another heuristic search algorithm to create a link to a document in the collection which is named and titled with the first service letter document number in order to create an actionable link (134) within the list (132). The compiling step (240) may use URL convention to recognize the URL hyperlink (136) to the second service letter document (320b), and the identifying step (250) may create a copy of the link (136) to the second service letter document (310b) within the list (132). Finally, the compiling step (240) may use a heuristic search algorithm based on the formatting of other document identification schemes, such as that used with the documentary text file (320a), to recognize references to such documents and the identifying step (250) may use another heuristic search algorithm to create a link to a document in the collection which is has, e.g., a header containing the reference in order to create an actionable link (138) within the list (132). Because the heuristic processes may be computationally intensive, it may be desirable to pre-execute steps 240-260, storing the results in local memory before, during, or after the initial display step but prior to the a user request to expand a nested display. In some instances, as further described below, it may be desirable to pre-execute steps like steps 240-260, storing the constructed list as metadata within a search database in order to provide near-real-time search results. It is noted that while such metadata could be stored within the documents themselves, such storage would in effect convert the documents to structured documents containing explicit and actionable links (330), albeit as metadata, to the other documents. Such storage raises permissions and consistency issues unrelated to the present application, and for the purposes of the application should be considered to create a document in which a compiling step (240) may simply follow the convention of a document or document collection standard, with the identifying step (250) using the document metadata to copy a link within a constructed list for subsequent display.

Referring now to FIG. 4, a second aspect of the disclosure relates to a method (400) for populating a search database so as to pre-execute steps like the prior-described compiling (240), identifying (250), and constructing (260) steps. For a specified document collection, for example, a collection specified by directory, logical data storage volume, a physical data storage volume, an index of data storage directories and/or volumes, etc. and/or a collection specified by crawling through a structured document collection, the method (400) comprises the steps of, 1) scanning the specified document collection (410) and 2) for each document in the specified document collection, a) compiling a list of secondary document references appearing in the document (420), b) identifying a link to each secondary document referenced in the list of secondary document references (430), and c) constructing a list of document secondary links (440). The method (400) also includes the step of storing a search database copy of the document within the search database (450); however, those of skill in the art will recognize that a search database copy need not be an identical copy of the source document, but may in fact include information relevant to a search algorithm (such as visible document text), omit information irrelevant to the search algorithm (such as linked graphic images, script instructions, and/or certain metadata), and add other information relevant to the search algorithm (such as reputation metrics) and search result (such as a document link to the source document, most typically a URL). The method (400) yet also includes the step of storing at least the identified links to secondary documents as metadata associated with the search database copy of the document 460. The method (400) and step 460 may store only the links themselves, permitting a display of the raw links in the lists (132, 142, and 152) of the nested display. However, in some embodiments the method 400 and step 460 may also store the link or reference recognized in the compiling step (420) in addition to the link created or copied by the indentifying step (260) so as to provide a more user-friendly description of the secondary document link for subsequent display. In other embodiments, the method 400 and step 460 may also store a heading or title copied from the referenced secondary document so as to provide a more user-friendly description of the secondary document link for subsequent display.

The compiling step (420) may again vary depending upon the nature of the document collection. If the document collection consists essentially of structured documents containing links to referenced secondary documents, the compiling step (420) may follow the convention of the document standard used in the document collection and/or primary document when adding secondary document references to the list. The identifying step (430) may similarly follow convention in identifying the link information in the secondary document reference link portion as the link to the secondary document. If the document collection has not been constructed with references to other documents as explicit and actionable links, then the compiling step (420) may apply a heuristic search algorithm, such as a regular expression or "regex" rule, to identify references to secondary documents according to their known characteristics. The identifying step (430) may subsequently use various strategies to identify the storage location of the referenced secondary document, such as using another heuristic search algorithm to identify a document within the document collection referenced by the referencing information and/or using an external index, database, or other information source to obtain links to secondary documents— particularly those not found within a document collection itself. It will be understood that the concepts and specific examples described in the context of the first aspect are equally applicable to the compiling and identifying steps described in this second aspect, and vice versa.

The various aspects, embodiments, implementations, and variations described above are intended to be illustrative in nature, and are not intended to limit the scope of the invention. In particular, the disclosed specific examples and figures, illustrating an application of the method to a document collection of semi-structured technical documents, are intended to demonstrate a broader applicability to well-defined, structured document collections as well as ad hoc, unstructured document collections. Any limitations to the invention will appear in the claims as allowed in view of the terms explicitly defined herein.

What is claimed is:

1. A method for presenting a search result, the method comprising the steps of:
   receiving a search query;
   applying a search algorithm to compare the search query against a document collection in order to generate a search result; and
   displaying the search result as a list of search result document links;
   wherein, for at least one search result document link, the method includes the steps of:
      compiling a list of secondary document references appearing in the linked document;
      identifying links to the secondary documents referenced in the list of secondary document references;
      constructing a list of search result document secondary links including each of the identified links; and
      further displaying the list of each identified search result document secondary link as a nested display under the at least one search result document link.

2. The method of claim 1, wherein the compiling step, the identifying step, and the constructing step are performed prior to the displaying step.

3. The method of claim 2, wherein the compiled list of secondary document references and constructed list of search result document secondary links are stored as metadata associated with a search database copy of the linked document.

4. The method of claim 1, wherein at least one of the compiling step, the identifying step, the constructing step, and the further displaying step are performed in response to a user selection of an element of a displayed search result document link.

5. The method of claim 4, wherein the element is an icon or text element included in the displayed search result document link.

6. The method of claim 1, wherein the compiling step employs a heuristic search algorithm to identify secondary document references appearing in the linked document.

7. The method of claim 6, wherein the heuristic search algorithm includes a regular expression rule.

8. The method of claim 1, wherein the identifying step employs a heuristic search algorithm to identify documents within the document collection corresponding to the secondary documents referenced in the list of secondary document references.

9. The method of claim 8, wherein the heuristic search algorithm includes a regular expression rule for matching referencing information in a secondary document reference in the list of secondary document references with a document characteristic selected from the group consisting of a document name, a document title, and a document heading.

10. The method of claim 1, wherein the further displaying step includes the steps of:
    applying the search algorithm to compare the search query against the linked documents of the constructed list of search result document secondary links;
    ordering the constructed list of search result document secondary links according to an apparent relevance determined by the search algorithm; and
    further displaying the ordered constructed list as the nested display under the at least one search result document link.

11. A method for populating a search database, the method comprising the steps of scanning though a specified document collection and, for each document in the specified document collection:
    compiling a list of secondary document references appearing in the document;
    identifying links to the secondary documents referenced in the list of secondary references;
    constructing a list of search result document secondary links including each of the identified links; and
    storing at least the list of search result document secondary links and the list of secondary document references as metadata, in combination with a search database copy of the document, within the search database.

12. The method of claim 11, wherein the compiling step employs a heuristic search algorithm to identify secondary document references appearing in the document.

13. The method of claim 12, wherein the heuristic search algorithm includes a regular expression rule.

14. The method of claim 11, wherein the identifying step employs a heuristic search algorithm to identify documents within the document collection corresponding to the secondary documents referenced in the list of secondary document references.

15. The method of claim 14, wherein the heuristic search algorithm includes a regular expression rule for matching referencing information in a secondary document reference in the list of secondary document references with a document characteristic selected from the group consisting of a document name, a document title, and a document heading.

16. A method of presenting a search result, the method comprising the steps of:
    scanning through a specified document collection and, for each document in the specified document collection:
       compiling a list of secondary document references appearing in the document;
       identifying links to secondary documents referenced in the list of secondary document references;
       constructing a list of search result document secondary links including each of the identified links; and
       storing at least the list of search result document secondary links as metadata associated with a search database copy of the document within the search database;
    followed by:
       receiving a search query;
       applying a search algorithm to compare the search query against the search database in order to generate a search result;
       displaying the search result as a list of search result document links; and
       for at least one search result document link, further displaying the stored list of each identified search result document secondary link, constructed for the associated document in the specified document collection, as a nested display under the at least one search result document link.

17. The method of claim 16, wherein the further displaying step is performed in response to a user selection of an element of a displayed search result document link.

18. The method of claim 17, wherein the element is an icon or text element included in the displayed search result document link.

19. The method of claim 16, wherein the compiling step employs a heuristic search algorithm to identify secondary document references appearing in the document.

20. The method of claim 16, wherein the identifying step employs a heuristic search algorithm to identify documents within the specified document collection corresponding to the secondary documents referenced in the list of secondary document references.

* * * * *